United States Patent Office 3,328,663
Patented June 27, 1967

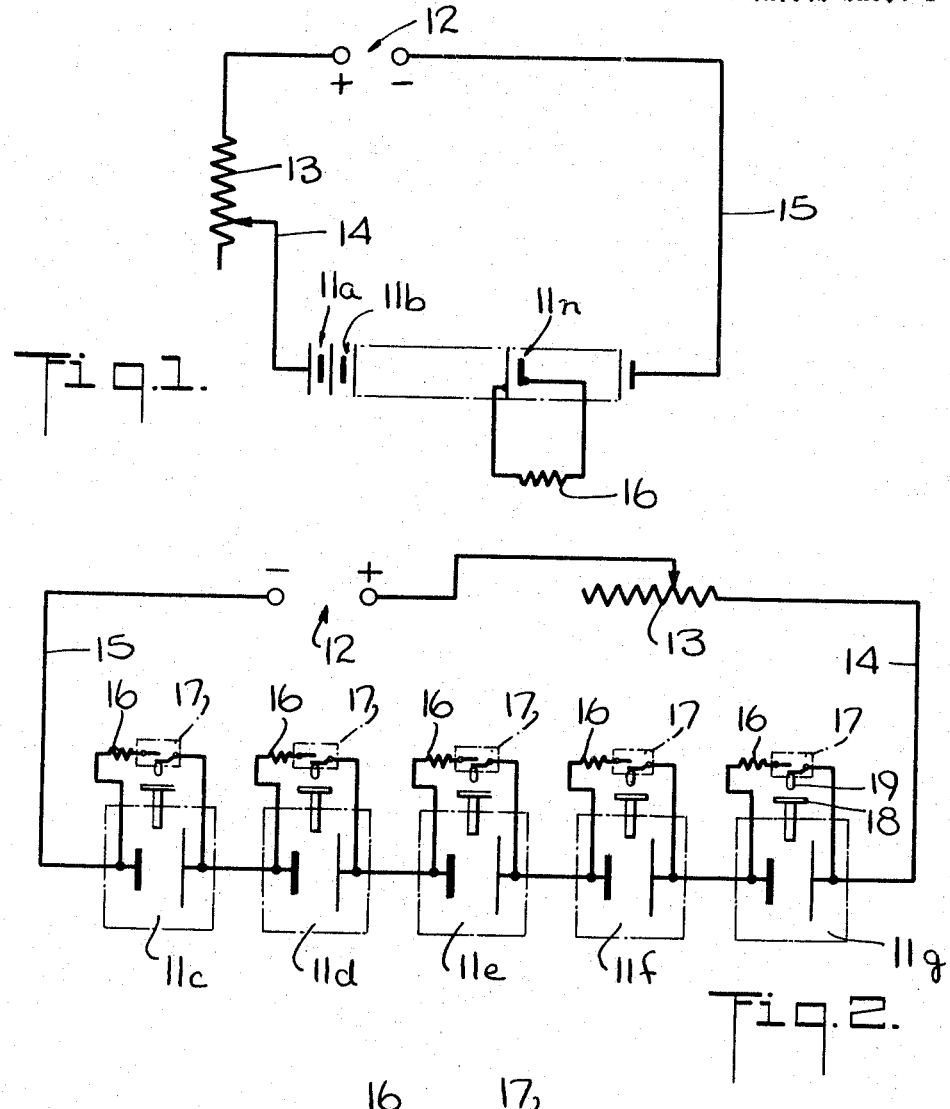

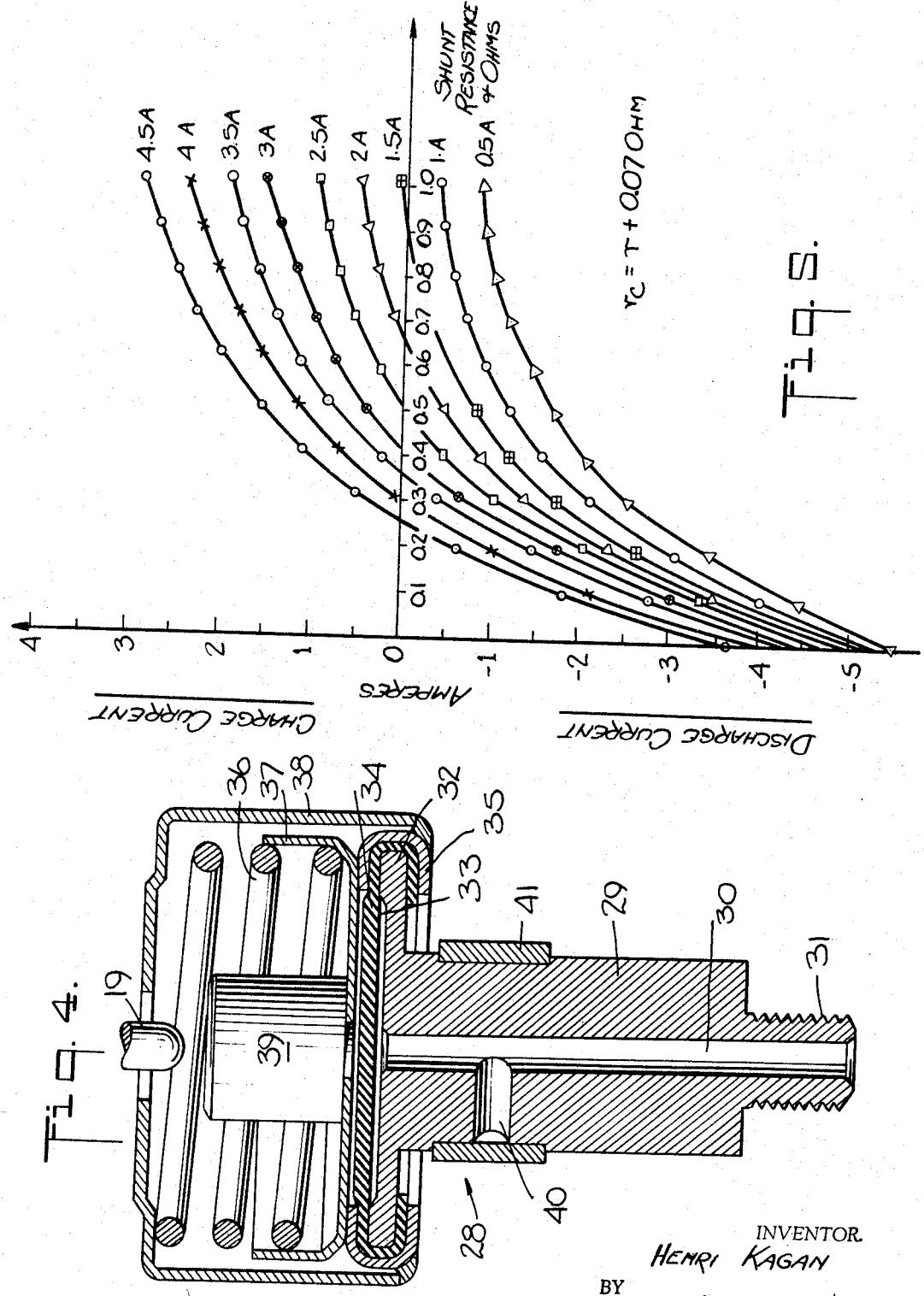

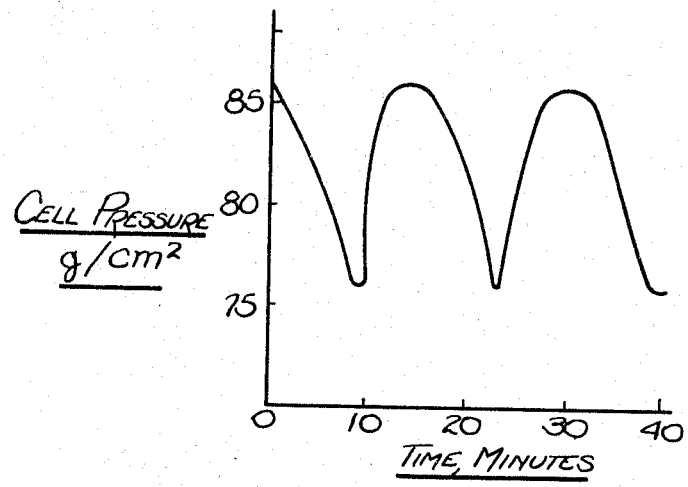
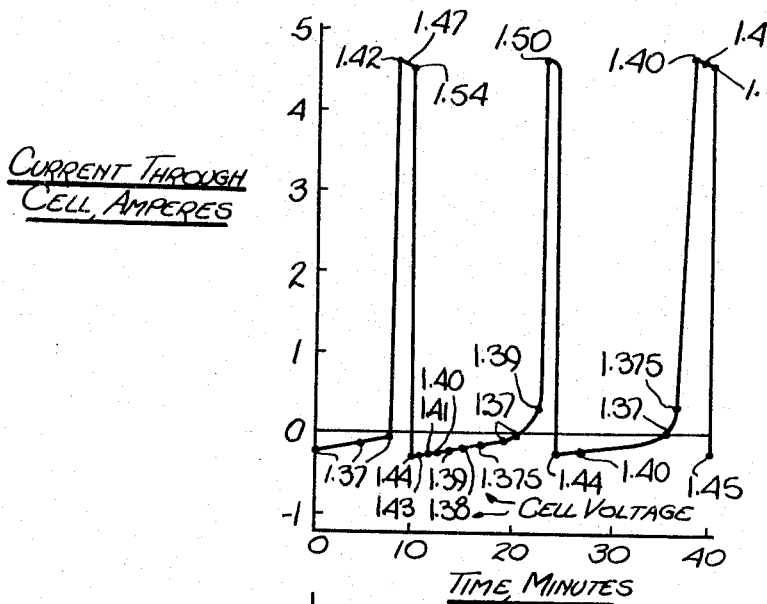
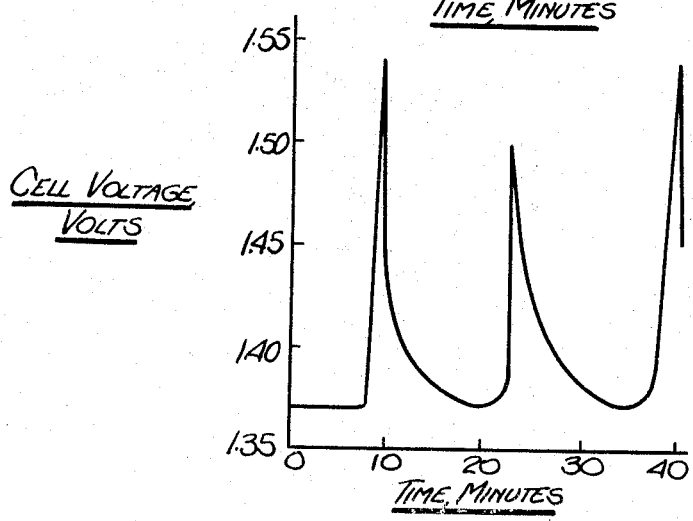

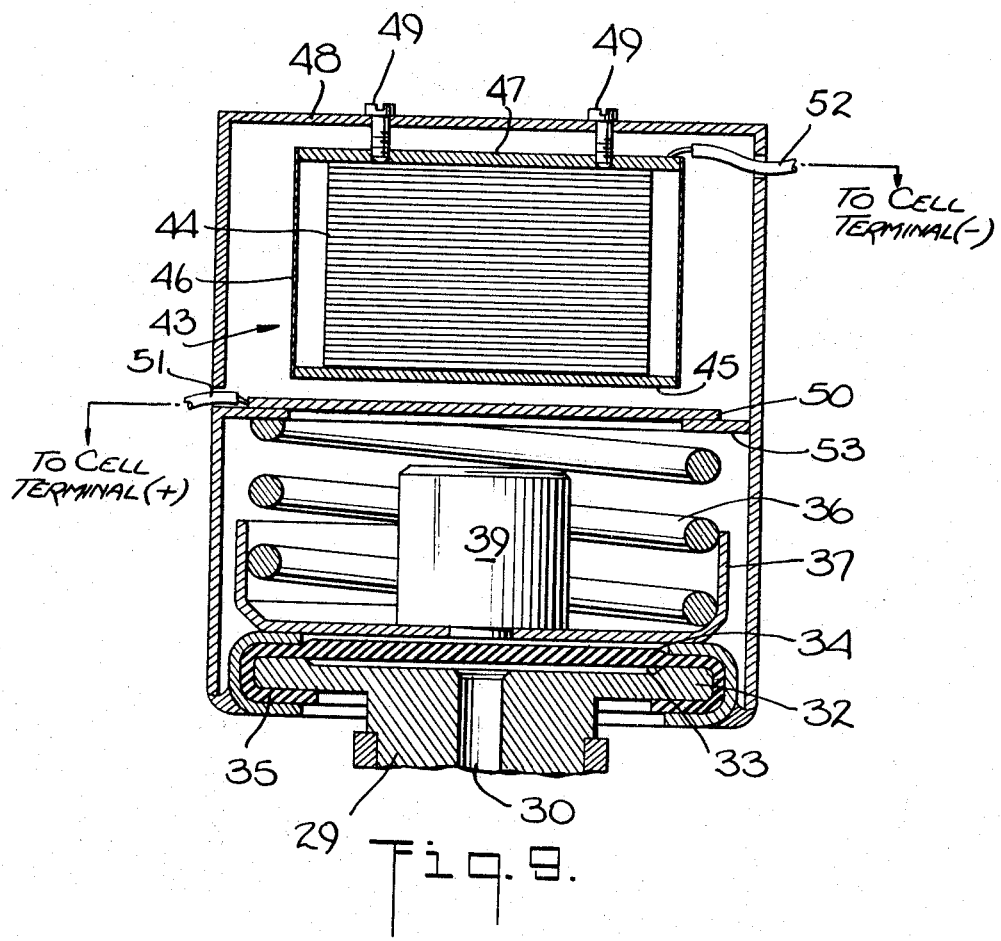

3,328,663
PRESSURE RESPONSIVE BATTERY CHARGER CONTROL
Henri Kagan, Pavillons-sous-Bois, France, assignor to Societe des Accumulateurs Fixes et de Traction (Societe Anonyme), Pont de la Folie, Romainville, France, a company of France
Filed Dec. 30, 1964, Ser. No. 422,322
Claims priority, application France, Dec. 31, 1963, 959,081
10 Claims. (Cl. 320—17)

This invention relates to a process for charging rechargeable electric cells and charging batteries made of a plurality of such cells, and more particularly relates to a charging process wherein the charging circuit is maintained throughout the charging operation. The invention further relates to cells and batteries adapted for the practice of such process, and to apparatus for such cells to adapt them for such process.

It is known that gas is evolved when rechargeable electric cells (often called secondary cells) are overcharged and, in some instances, during the charging operation prior to, and especially shortly prior to, reaching a fully charged state. The rate of evolution of gas and the amount of gas evolved depend essentially upon the amperage of the charging current passing through the cell. Such gas evolution constitutes a potential problem, especially with respect to cells which are designed to retain gas and their electrolyte under elevated pressure. Such cells may be of the type which are adapted to maintain within the cell gas under elevated pressure, but which have pressure relief means, as well as those cells characterized in the art as "sealed cells" and which generally do not have any means of relieving the internal pressure.

To avoid the creation of excessively high gas pressures with such cells, with consequent risk of damage to the cell or loss of the gases which have evolved from the electrolyte, it has been proposed previously to provide them with means by which the charging current is interrupted, that is, stopped, in response to increased pressure within a cell. After the charging current is stopped, the gas will disappear slowly, thus reducing the internal pressure. An illustration of cells provided with one such means is given in United States Patent No. 2,269,040.

It is characteristic, however, of heretofore known means for avoiding incipient excessive gas pressure during recharging that the charging of the entire battery of cells is interrupted when the internal pressure of any single cell starts to become excessive. This is because all the cells are connected within the battery in series, and each cell forms an integral and necessary portion of the charging circuit. Inasmuch as each battery may comprise a large number of cells, often ten, and sometimes more than fifty, and the time taken by each cell to evolve sufficient gas to create an undesirably high pressure varies considerably from cell to cell, a device which interrupts the charging current for the entire battery as any single cell reaches a pressure sufficient to break the circuit, and which maintains the charging current interruption until the pressure in such cell subsides, has the substantial disadvantage of unduly prolonging the time necessary to fully recharge all the cells in the battery.

It is an object of this invention to provide a process of recharging a battery without interrupting the charging circuit but at the same time protecting the individual cells from damage as a result of overcharging or excessive internal pressure.

It is another object of this invention to provide a process of recharging cells and batteries of rechargeable cells which prevents the build-up of excessive pressure from gases evolved during recharging or overcharging.

An additional object is to provide batteries and cells therefore which may be continuously charged, without damaging the cells, in less time than heretofore.

A further object is to provide apparatus for attaching to cells for a battery which permit the battery to be recharged without interruption and without damaging the individual cells through the creation of excessive internal pressure.

Briefly stated, in one embodiment of the invention, a cell is recharged in accordance with the invention by directly or indirectly connecting electrically a charging source to the terminals (positive and negative) of a rechargeable cell, of the kind which evolves gas upon being overcharged and is capable of maintaining fluids under pressure, electrically shunting the cell by a resistance in parallel between the cell's terminals in response to increased pressure within the cell above a predetermined pressure, and ceasing such shunting in response to decreases in the cell's internal pressure, while maintaining a closed electrical circuit between the terminals and the charging source during such shunting. The resistance optionally may be varied as a function of the changes of the cell's internal pressure above such pre-determined pressure.

In another embodiment, a battery, comprising at least one cell, and preferably entirely of cells, of the character and equipped as herein disclosed may be continuously recharged by connecting its terminals to a charging source and maintaining a closed electrical circuit between such terminals and the source, yet without risk of damage to any cell so equipped and without the time delay resulting from an interrupted charging circuit.

In another briefly stated embodiment, the rechargeable cells, of the kind that evolve gas upon overcharging, equipped in accordance with this invention comprise a casing capable of maintaining fluids under internal pressure, an electrolyte, a positive terminal, a positive electrode electrically connected to the positive terminal, a negative terminal, a negative electrode electrically connected to the negative terminal, a manometer means and a separate circuit electrically closable between the terminals (and in parallel with the electrodes-electrolyte system) of the cell. Such circuit comprises a resistor and a switch means adapted for co-action with the manometer means, which may optionally be based upon the action of a membrane or diaphram. The latter is responsive to increases in the internal pressure within the cell's casing, and adapted to co-act with such switch means to close such shunt circuit when the internal pressure within the casing increases above a pre-determined pressure, and to open the circuit when the internal pressure decreases to a pressure less than such pre-determined pressure.

In a further embodiment of the invention, the foregoing cell may be initially assembled without the shunt circuit comprising the aforesaid resistor and switch means, but adapted to receive such circuit at a later time.

Alternatively, such manometer means and circuit may be assembled together, and the remainder of the cell may be assembled separately and be adapted to receive later the manometer and switch means sub-assembly.

Other objects and features will become apparent in the following description and the accompanying drawings, in which:

FIG. 1 diagrammatically shows a battery and charging circuit;

FIG. 2 diagrammatically shows a charging circuit and a battery, each cell of which is equipped according to the invention;

FIG. 3 is a schematic partial sectional view on a larger scale of a single cell equipped according to the invention;

FIG. 4 is a sectional view of a specific embodiment of a manometer means;

FIG. 5 is a set of curves showing the variation of the current of a cell as a function of the resistance across its terminals;

FIG. 6 is a plot of the inner pressure of a cell recharged in accordance with the invention, versus time;

FIG. 7 is a plot of the current flowing through the same cell, cell, versus time;

FIG. 8 is a plot of the voltage of the same cell, versus time; and

FIG. 9 is a sectional view of a combined manometer means and a variable-resistance shunt resistor.

According to the embodiments shown on FIGURES 1 through 3, a battery comprises a number of cells $11_a$, $11_b$, $11_c$, ... $11_n$, charged by a power source 12, through a resistor 13, and lead wires 14, 15. A shunt resistor 16 is connected across the terminals of cell $11_n$ shown in FIGURE 1 and all the cells of FIGURE 2. A switch 17 (see FIGS. 2 and 3), preferably of the microswitch type, is provided in the circuit of resistor 16. The internal pressure of the cell acts upon membrane 18 of the manometer means which actuates finger 19 of a microswitch 17.

Additional details of a single cell are shown in FIGURE 3. Within casing 20, two sets of positive and negative electrodes $21_{(a)}$ and $21_{(b)}$ with terminals 22, 23 respectively, are electrically connected on the one hand to the charging device through leads 14 and 15, and on the other hand, to the microswitch 17, through leads 24 and 25 and resistor 16.

The finger 19 of a microswitch 17 coacts with membrane 18, disposed in a frame 26, and subjected through passageway 27 to the action of the internal pressure of the cell.

Referring now to FIG. 4, a manometer means 28 comprises a support member 29 with a bore 30 for a passageway which is connected to the inside of the cell, member 29 being threadably engageable with a cell casing by means of threads 31. The top of member 29 ends in a plate 32 with a recess 33. Membrane 34 is stretched across plate 32 and held in place by a ring 35. Above the ring 35 there is return means consisting of a helical spring 36 nested in a collar 37 and bearing against outer housing 38. In the center of the collar 35, a contact member 39 is provided to cooperate with finger 19 of the microswitch 17. The length of member 39 is determined according to the intended deformation of membrane 34 and therefore according to the permissible internal cell pressure.

The frame of microswitch 17 may be fastened to the outer housing 38 by any convenient means e.g., screws through holes not shown in housing 38.

Support member 29 may be provided with a relief port 40 leading off bore 30 to the outside atmosphere, but enclosed by a gasket 41 made of rubber or other suitable material which maintains a gas-tight seal at moderate pressures but which yields at higher pressures, thus acting as a safety valve.

Equivalent mechanical devices may be used instead of a membrane to perform the manometer function. A metallic diaghragm or bellows may be used, as also may be a bourdon tube. The support, contact member, and return means of the manometer means show in FIG. 4 naturally would be somewhat modified if such equivalents were substituted for the membrane.

In recharging a battery as shown in FIGURE 2, each cell of which is equipped as shown in FIGS. 3 and 4, the leads 14 and 15 from the charging source 12 are connected to the battery terminals (not shown), and left so connected during the charging operation. Initially, little or no gas is evolved, but as the charging progresses, sooner or later one of the cells (illustratively, cell $11_{(g)}$) evolves gas and its pressure becomes sufficient to cause membrane 18 to distend upward against the resistance of spring 36, thus causing contact member 39 to coact with microswitch finger 19 and close switch 17. This electrically connects resistor 16 between terminals 22 and 23 of the cell. As explained hereinafter, this shunting reduces, eliminates or reverses the current passing through the cell, thus reducing or eliminating further gas evolution in that cell so long as the shunting circuit remains closed. The pressure at which the switch 17 is closed is pre-determinable, illustratively 85 grams per square centimeter, and the mechanical train (membrane 18, collar 37, contact member 39 and switch finger 19) are designed accordingly. As the gas in the cell is resorbed, the internal pressure decreases, membrane 18 becomes less distended, return spring 36 acts, and switch 17 opens, thus removing the shunting circuit and permitting the full charging current to pass through the cell.

The foregoing shunting operation may, and often will, repeat itself a plurality of times for any single cell during the recharging of a battery. Furthermore, the shunting operation may be occurring on two or even a large number of cells at the same time. However, it is especially to be noted that no matter how often a cell is shunted during recharging, or how many cells are being shunted at any given point in time, the current from the charging source to and through the battery is not interrupted on account of pressure build-up in the cells, and those cells which are not being shunted are still being recharged.

The following discussion given for a better understanding provides a useful analytical example for the by-now obvious question of what amount of electrical resistance should be used in the shunting resistor.

Supposing that the charging circuit of the battery supplied by the source gives a current with a voltage E, that the value of the variable resistor 13 of this circuit is R, thus providing a charging current I, that the $n$th cell of the battery has a voltage $e$, and that the resistor 16 shunting the cell has a resistance $r$. The current I is divided into its algebraic components, one of which $i_1$ directly flows through the cell and the other, $i_2$, flows through the circuit of the shunt resistor. Then the following relations may be written according to Kirchoff's laws:

$$RI+e-E=0 \qquad \text{Equation 1}$$
$$E=RI+ri_2 \qquad \text{Equation 2}$$
$$e=ri_2 \qquad \text{Equation 3}$$
$$I=i_1+i_2 \qquad \text{Equation 4}$$

The following relation is derived from the four foregoing equations:

$$i_1=\frac{E}{R}-e\left(\frac{1}{R}+\frac{1}{r}\right) \qquad \text{Equation 5}$$

When the current flowing through the cell decreases to 0, for a suitable value of the shunt resistor $r$, i.e., when the charging of the cell is stopped, $i_1=0$ and in this case:

$$\frac{E}{R}=e\left(\frac{1}{R}+\frac{1}{r}\right) \qquad \text{Equation 6}$$

From Equation 6 the following relation is derived:

$$r=(R)\frac{e}{E-e} \qquad \text{Equation 7}$$

Equation 7 defines a critical resistance $r_c$ of the shunt resistor for which no current flows through the cell.

If the resistance of the shunt resistor is higher than this critical value, a relatively low current flows through the cell, since then $i_1$ is greater than 0. Then the charging current is low and may reach the so-called floating rate.

If the resistance of the shunt resistor is less than the critical resistance value, the cell is discharged through the shunt resistor, since at this time $i_1$ is less than 0.

Three numerical examples of the application of the foregoing are given.

EXAMPLE 1

A battery of cells, each having a voltage $e=1.5$ volt at the beginning of overcharge, is charged under a voltage of 120 volts, the resistance R being determined such that the charging current is 4.5 a., thus R equals 26.67 ohms. (For the hypothetical battery of these examples this would provide a minimum recharging time of five hours for a battery having a capacity (C) of 22.5 ampere hours.) The following relation may be written from Equation 7:

$$r_c = 26.67 \times \frac{1.5}{118.5} = 0.33 \text{ ohm}$$

Thus $r_c$ is the so-called critical resistance which must be given to the shunt resistor in order to stop the charge of the cell when the resistor is connected.

EXAMPLE 2

With the same data as in Example 1, if a low (1 ampere) current must be maintained through the cell, and the total charging current of the battery, still being 4.5 a., the following relation may be written:

$$i_2 = I - i_1 = 4.5 - 1 = 3.5 \text{ a.}$$

which gives:

$$r_f = \frac{e}{i_2} = \frac{1.5}{3.5} = 0.43 \text{ ohm}$$

In other words, if the cell must be charged at a low rate (1 ampere) when the shunt resistor is connected, the resistance of the resistor must be 0.43 ohm.

EXAMPLE 3

With the same data as in Examples 1 and 2, if the cell must be discharged at the rate of 0.5 a., when its voltage reaches 1.5 volts, the following relation may be written:

$$i_2 = I + i_1 = 4.5 + 0.5 = 5 \text{ a.}$$

which gives:

$$r_d = \frac{1.5}{5} = 0.3 \text{ ohm}$$

Thus the resistance for which the cell is discharged as soon as the inner pressure increases is obtained.

Experimental tests are shown in the following table:

| Run No. | 1 | 2 | 3 | 4 | 5 | 6 | 7 | 8 |
|---|---|---|---|---|---|---|---|---|
| Charging current I, amperes | 4.5 | 4 | 3.5 | 3. | 2.5 | 2 | 1.5 | 1 |
| Experimental values $r_c$, ohms | 0.32 | 0.37 | 0.43 | 0.48 | 0.58 | 0.70 | 0.95 | 1.47 |
| Calculated value of $r_c$ in ohms | 0.33 | 0.37 | 0.42 | 0.5 | 0.6 | 0.75 | 1 | 1.5 |

It may be seen that experimental results are in good agreement with those predicted.

A set of experimental curves has been plotted on FIG. 5. They show the variations of the charging current through a cell versus the value of the shunt resistor. The charging and discharging current values have been plotted in ordinate and the resistance value in abscissae. The curves have been plotted for various values of the total charging current, i.e. the output current of the charging power source.

These curves have been plotted without taking into account the resistance of the ammeter used for the various measurements. Consequently, the resistance of the ammeter, equal to 0.07 ohm, is to be added to the different values of the resistance $r$. However, in the foregoing table, the experimental values of $r_c$ do take into account the resistance (0.07 ohm) of such ammeter.

The experimental results in the above table are included in these curves.

It was found that in an apparatus constructed according to the invention an automatic regulation was obtained. When the internal pressure of a cell reaches such a value that the charge stops or that the said cell is discharged, the gas has time enough to escape or to be resorbed, and as soon as the pressure drops, the shunt resistor is cut out of the circuit. Then the charge of the cell begins again under the usual conditions and when the limit of overcharge is again reached, the manometer operates and the shunting cycle starts again.

FIGS. 6, 7 and 8 show the experimental results. On FIG. 6 the pressure in $g./cm.^2$ existing in the cell is plotted on the ordinate and the time in minutes on the abscissae. When the pressure reaches 86 $g./cm.^2$, the charging current through the cell is cut and after about 9 minutes, the pressure falls to 76 $g./cm.^2$. Then the charge starts again, the pressure increases and the same cycle begins again.

In FIGURE 7, time in minutes is again plotted on the abscissae, and the variations of the current (in amperes) flowing through the cell are plotted on the ordinate. The terminal voltages of the cell are indicated on the curves. The substantially vertical lines correspond to the switching on or off of the shunt resistor.

However, it may be noted that when the shunt resistor is connected, the terminal voltage of the cell varies steeply at first, then gradually after the moment of connecting. On the other hand, suppose that the terminal voltage of the overcharged cell is, for example, 1.5 volts, and that the shunt resistor has such a resistance that there is no current flowing through the cell. (This is the resistance given by Equation 7.) As soon as the cell is no longer in charge, its voltage becomes lower and reaches, for example 1.38 volts. This new voltage determines a new critical resistance of the shunt resistor smaller than its initial value. If the shunt resistance has a constant value, this value now will be higher than it should be for zero current through the cell (a null current situation), and as a result a relatively low current flows through the cell. This explains the reason why the current flowing through the cell when the shunt resistor is put in the circuit cannot be stabilized at its new value. The algebraic value of such current increases progressively.

In FIGURE 8, the voltage variations of a cell are plotted versus time. Of course, this curve corresponds to both previous curves of FIGS. 6 and 7. It is to be noted that due to the invention it is possible to obtain an automatic regulation for days with a charging current having the capacity value C in ampere-hours.

In view of the foregoing, it is advantageous to use a shunt resistor in which the resistance varies depending upon the magnitude of the internal pressure within the cell's casing. Resistors made of grains or discs of carbon have resistivities which decrease as the pressure on them increases, and conversely.

By way of illustration, when using a variable shunt resistor, a charging current of 2.5 a. (see FIG. 5) and a critical resistance $r_c$ equal to 0.57 ohm, and a shunt resistor having a resistance of 0.47 ohm when put into the circuit, the cell is discharged at a rate of about 0.40 a. As the cell pressure decreases, the resistance increases. When it reaches 0.57 ohm, the current through the cell is null. As the pressure decreases further, the resistance increases, and when it reaches 0.87 ohm, for example, a new low charging current of 0.75 a. flows through the cell.

A specific embodiment of a combined manometer means (of the general type illustrated in FIG. 4) and a pressure-sensitive variable shunt resistor is shown in FIG. 9. The manometer means comprises, as in FIGURE 4, support member 29, bore 30, plate 32, recess 33, membrane (or diaphragm) 34, ring 35, spring 36, contact member 39, and collar 37. An outer housing 42 encloses the spring and collar, and extends upwardly to enclose variable shunt resistor means 43. The latter comprises a stack 44 of a plurality of thin carbon discs, the resistance of which is a function of the pressure exerted on it. The discs are carried by member 45, which is carried by thin deformable walled cylinder 46 which in turn is carried by member 47. The latter is carried by the top 48 of housing 42, using screws 49. Each disc is in electrical contact with its adjacent discs, and the top and bottom discs contact members 47 and 45, respectively. Cylinder 47 should be slightly deformable, thereby permitting upward pressure on member 45 to be transmitted to the stack of discs.

Contact plate 50 is carried by ledge 53. When membrane 34 is not distended, stack 44 and member 45 are spacedly disposed slightly above contact member 50, but sufficiently close to make electrical contact in response to movement of contact member 39 and membrane 34 and at a pre-determined pressure within a cell to which the aforesaid apparatus may be attached. Wires 51 and 52 lead from contact plate 50 and member 47, respectively, and are adapted for connection to the terminals of such a cell.

As membrane 34 is distended as a result of increased pressure within a cell, it upwardly displaces collar 37, contact member 39 and contact plate 50 touches member 45, it closes the shunt circuit comprising wire 51, plate 50, member 45, the stack of carbon discs 44, member 47 and wire 52, thus shunting the cell and reducing the current passed through the cell to a lower positive value, or to a null value, or to a low negative current, depending upon the design of the shunt circuit and the cell, and the existing electrical conditions. Normally the cell current would be reduced to a low positive value. If the cell pressure continues to rise subsequent to the initial electrical contact between contact plate 50 and member 45, the increased cell pressure causes greater pressure to be exerted upon carbon discs 44, thereby reducing the resistance of the stack 44 of carbon discs and as a consequence further reducing the current through the now-shunted cell until it reaches a null value.

Supposing that a 5 amperes charging current flows through the battery, a variable shunt resistor of the character just described comprises a stack of 108 carbon discs having a diameter of 11 millimeters and a thickness of 0.35 millimeters. The dissipatable power of such resistor is approximately six watts. Such a stack of carbon discs has a resistance of about 55 ohms at 40 g./cm.$^2$ pressure, 30 ohms at 100 g./cm.$^2$ and 2.5 ohms at 2000 g./cm.$^2$. The discs of 0.35 millimeter thickness may be replaced by discs of one millimeter thickness, and the resistance of a stack approximately 40 millimeters in height of such one millimeter thick discs has resistances of about 21, 12, and 1.3 ohms at the foregoing pressures, respectively.

Inasmuch as pressure sensitive carbon resistors have somewhat high resistances for some applications of this invention, the overall shunt circuit may optionally comprise a conventional resistor in parallel across the carbon resistor. This has the effect of reducing the amount of resistance in the shunt circuit to a sufficiently low magnitude for use with cells, but still yields the advantages of a variable resistor shunt circuit.

Thus it is observed that the invention provides a method of charging individual cells and batteries of cells which automatically protects the cells from damage from excessive internal pressure yet reduces the time necessary to recharge batteries by virtue of the fact that the charging current is never interrupted, and only the individual cells temporarily subjected to excessive pressure have all or a major portion of the charging current shunted around them. The invention further provides simple and economical apparatus to use with cells in practicing the process.

Having thus described the invention, I claim:

1. A process for charging a cell capable of maintaining fluids under internal pressure, which process comprises continuously maintaining a closed electrical circuit between a charging source and the positive and negative terminals of a rechargeable cell, said cell being characterized by the evolution of gas during the overcharging thereof and further characterized by ability to maintain fluid under internal pressure, electrically shunting the cell by a variable resistance in parallel between the terminals of said cell in response to increased pressure within said cell above a pre-determined pressure, varying the magnitude of said resistance in response to variations of said increased pressure, and ceasing said shunting in response to decreased pressure within said cell below said predetermined pressure.

2. A process for charging a battery, which process comprises electrically connecting a charging source to the terminals of a battery comprising a plurality of rechargeable cells characterized by the evolution of gas upon the overcharging of said cells and further characterized by ability to maintain fluids under internal pressure, electrically connecting a variable resistance in parallel between the terminals of at least one of said cells in response to increased internal pressure in said cell above a pre-determined pressure, varying the magnitude of said resistance in response to changes of said internal pressure above said pre-determined pressure, and maintaining a closed electrical circuit between said terminals and said charging source during said connecting.

3. A battery comprising a plurality of rechargeable cells, said cells being characterized by the evolution of gas upon being overcharged, and comprising a casing capable of maintaining gas under elevated internal pressure, an electrolyte, a positive terminal, a positive electrode electrically connected to said positive terminal, a negative terminal, a negative electrode electrically connected to said negative terminal, a variable resistor in series with one of said terminals and one of said electrodes, at least one of said cells comprising manometer means and a separate circuit electrically closable between the terminals thereof, said circuit comprising a resistor whose resistance has a value $$r = Rx \frac{e}{E-e}$$

where E is the charging voltage, R the value of the variable resistor and e is the voltage of the cell and an electrical switch means adapted for co-action with said manometer means, said manometer means being responsive to variations in the pressure within said cell, and being adapted to co-act with said switch means to close said circuit when the internal pressure increases above a predetermined magnitude, and further adapted to open said circuit when said internal pressure decreases below said magnitude.

4. A battery comprising a plurality of rechargeable cells, said cells being characterized by the evolution of gas upon being overcharged, and comprising a casing capable of maintaining gas under elevated internal pressure, an electrolyte, a positive terminal, a positive electrode electrically connected to said positive terminal, a negative terminal, a negative electrode electrically connected to said negative terminal, a variable resistor in series with one of said terminals and one of said electrodes, at least one of said cells comprising manometer means and a separate circuit electrically closable between the terminals thereof, said circuit comprising a resistor whose resistance has a value $$< r = Rx \frac{e}{E-e}$$

where E is the charging voltage, R the value of the first-named variable resistor and e is the voltage of the cell so that the charged cell will discharge into the second-named resistor and an electrical switch means adapted for co-action with said manometer means, said manometer means comprising a diaphragm and being responsive to changes in the internal pressure within said cell, and adapted to co-act with said switch means to close said circuit when the internal pressure increases above a pre-determined magnitude and further adapted to open said circuit when the internal pressure decreases.

5. A battery comprising a plurality of rechargeable cells, said cells being characterized by the evolution of gas upon being overcharged and comprising a casing capable of maintaining gas under elevated internal pressure, an electrolyte, a positive terminal, a positive electrode electrically connected to said positive terminal, a negative terminal, a negative electrode electrically connected to said negative terminal, at least one of said cells comprising a separate circuit electrically closable between the terminals of said cell, said circuit comprising a variable resistor and an electrical switch means adapted for co-action with hereinafter recited manometer means, and individual cell manometer means responsive to variations in the pressure within said individual cell and adapted to co-act with its switch means to close its separate circuit when its pressure increases above a pre-determined pressure and to open said circuit when its internal pressure decreases below said pre-determined pressure, and further adapted to co-act with said variable resistor to vary the magnitude of the resistance in said circuit in response to variations of said pressure.

6. A battery comprising a plurality of rechargeable cells, said cells being characterized by the evolution of gas upon being overcharged and comprising a casing capable of maintaining gas under elevated internal pressure, an electrolyte, a positive terminal, a positive electrode electrically connected to said positive terminal, a negative terminal, a negative electrode electrically connected to said negative terminal, at least one of said cells comprising a separate circuit electrically closable between the terminals of said cell, said circuit comprising a variable resistor and an electrical switch means adapted for co-action with hereinafter recited manometer means, said variable resistor comprising a plurality of carbon discs, and individual cell manometer means responsive to variations of the internal pressure within said individual cell and adapted to co-act with its switch means to close its separate circuit when its internal pressure increases above a pre-determined pressure, and to open said circuit when its internal pressure decreases, and further adapted to co-act with said variable resistor to vary the magnitude of the resistance in said circuit in response to variations of said internal pressure.

7. A battery comprising a plurality of rechargeable cells characterized by the evolution of gas upon being overcharged, each cell comprising a casing capable of maintaining gas under elevated internal pressure, an electrolyte, a positive terminal, a positive electrode electrically connected to said positive terminal, a negative terminal, a negative electrode electrically connected to said negative terminal, a variable resistance in series with one of said terminals and one of said electrodes; a separate circuit electrically closable between the terminals of each cell comprising a resistor whose resistance has a value $$r < Rx\frac{e}{E-e}$$

where E is the charging voltage, R the value of the variable resistor and e is the voltage of the cell and an electrical switch means adapted for co-action with hereinafter recited manometer means, and individual cell manometer means responsive to changes in the internal pressure of said individual cell and further adapted to co-act with its switch means to close its separate circuit when its pressure increases above a pre-determined magnitude so that said maintenance current will continue to flow through the cell even when it is shunted by said resistor, and to open said circuit when its internal pressure decreases.

8. A rechargeable cell comprising a casing capable of maintaining fluids under elevated internal pressure, an electrolyte, a positive terminal, a positive electrode electrically connected to said positive terminal, a negative terminal, a negative electrode electrically connected to said negative terminal, said cell being characterized by the evolution of gas upon being overcharged, a separate circuit electrically closable between said terminals, said circuit comprising a variable resistor and an electrical switch means, and manometer means responsive to changes of pressure within said casing and adapted to co-act with said switch means to close said circuit when the internal pressure in said casing increases above a pre-determined pressure and to open said circuit when the internal pressure decreases, and further adapted to co-act with said variable resistor to vary the magnitude of the resistance in said circuit in response to changes of said internal pressure.

9. A rechargeable cell characterized by the evolution of gas upon being overcharged which cell comprises a casing capable of maintaining fluids under internal pressure, an electrolyte, a positive terminal, a positive electrode electrically connected to said terminal, a negative terminal, a negative electrode electrically connected to said negative electrode, manometer means responsive to changes of pressure within said casing, and a pressure sensitive variable resistor; said manometer means comprising a support member carried at one end thereof by said casing in gas-tight engagement therewith, a distensible membrane carried by said support member at the other end thereof in gas-tight engagement therewith and subject to the internal pressure within said casing, and pressure transmission means responsive to distension of said membrane, said switch means comprising a contact member carried by said transmission means, said contact member being electrically connected to one of said terminals and being adapted to make electrical contact with and to compressively engage said resistor; said variable resistor comprising a stack of a plurality of thin discs of carbon each in electrical contact with adjacent discs and with the disc nethermost from said contact member being electrically connected to the other of said terminals, said stack being spacedly disposed above said contact member when said membrane is not distended and adapted for electrical contact and compressive engagement therewith upon distension of said membrane beyond at least a pre-determined amount.

10. A rechargeable cell comprising a casing capable of maintaining fluids under internal pressure, an electrolyte, a positive terminal, a positive electrode electrically connected to said terminal, a negative terminal, a negative electrode electrically connected to said negative terminal, said cell being characterized by the evolution of gas upon being overcharged and manometer means responsive to changes of pressure within said casing and adapted to coact with auxiliary switch means to close electrically said auxiliary switch means when the internal pressure in said casing increases above a pre-determined pressure, thereby connecting a circuit between said terminals, and further adapted to open said switch means when said internal pressure decreases, said manometer means comprising a support member carried at one end thereof by said casing in gas-tight engagement therewith, a distensible membrane carried by said support member at the other end thereof in gas-tight engagement therewith, a spring, a collar, a contact member, and a frame carried by said support member, said support member having an internal passageway therethrough adapted to permit the internal pressure within said casing to bear against the inner surface of said membrane, said collar bearing on the outer side of said membrane, said spring disposed between said collar and said frame and urging said collar against said membrane, said contact member being carried by said collar and adapted to co-act with and close said switch means upon distension of said membrane beyond a predetermined amount.

References Cited
UNITED STATES PATENTS

| | | | |
|---|---|---|---|
| 2,104,632 | 1/1938 | Agnew | 320—46 X |
| 3,100,862 | 8/1963 | Collier | 320—46 |
| 3,102,222 | 8/1963 | Harmer | 320—46 X |
| 3,116,439 | 12/1963 | Riebs | 317—22 |
| 3,252,071 | 5/1966 | Plessis | 320—46 |

JOHN F. COUCH, *Primary Examiner.*

S. WEINBERG, *Assistant Examiner.*